United States Patent
O'Grady et al.

(10) Patent No.: US 10,544,632 B2
(45) Date of Patent: Jan. 28, 2020

(54) COILED TUBING ELECTRICAL POWER SPLICE

(71) Applicant: Baker Hughes, a GE Company, LLC, Houston, TX (US)

(72) Inventors: Kenneth O'Grady, Collinsville, OK (US); David R. Roy, Midland, TX (US); Scott C. Strattan, Broken Arrow, OK (US); John Mack, Catoosa, OK (US); Joseph Scott Thompson, Owasso, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 249 days.

(21) Appl. No.: 15/726,593

(22) Filed: Oct. 6, 2017

(65) Prior Publication Data
US 2019/0106948 A1    Apr. 11, 2019

(51) Int. Cl.
| | | |
|---|---|---|
| *E21B 17/02* | (2006.01) | |
| *E21B 17/20* | (2006.01) | |
| *H01R 13/52* | (2006.01) | |
| *H02G 15/18* | (2006.01) | |
| *H02G 15/10* | (2006.01) | |
| *H02G 3/04* | (2006.01) | |
| *H02G 3/06* | (2006.01) | |
| *H01R 4/20* | (2006.01) | |

(52) U.S. Cl.
CPC .......... *E21B 17/206* (2013.01); *E21B 17/028* (2013.01); *H02G 15/10* (2013.01); *H02G 15/18* (2013.01); *H01R 4/20* (2013.01); *H01R 13/521* (2013.01); *H02G 3/04* (2013.01); *H02G 3/06* (2013.01)

(58) Field of Classification Search
CPC ..... E21B 17/206; E21B 17/028; H02G 15/10; H02G 15/117; H02G 15/18; H02G 1/10; H02G 1/14; H02G 3/04; H02G 3/06; H02G 9/06; H01R 4/20; H01R 13/521
USPC .............................................. 174/88 R, 84 R
See application file for complete search history.

(56) References Cited

U.S. PATENT DOCUMENTS

| | | | |
|---|---|---|---|
| 4,362,352 A * | 12/1982 | Hawkins .................. | H01R 4/52 174/90 |
| 6,545,221 B1 | 4/2003 | Halpert et al. | |
| 8,507,795 B2 * | 8/2013 | Karlstrand ............. | H02G 15/14 174/84 R |

(Continued)

OTHER PUBLICATIONS

U.S. Appl. No. 15/585,663, filed May 3, 2017.

*Primary Examiner* — David J Bagnell
*Assistant Examiner* — Yanick A Akaragwe
(74) *Attorney, Agent, or Firm* — Bracewell LLP; James E. Bradley

(57) ABSTRACT

A splice connects segments of coiled tubing and power cable together. The splice has a base and a head, each having an interior conical surface and a collet with fingers that deflect inward in gripping engagement with one of the segments in response to axial movement of the head collet and the base collet. A compression sleeve extends between the base collet and the head collet and exerts forces on the collets while the base and head are being secured together. An insulator tube slides over each of the power conductors. A retainer ring for each insulator tube grips one of the power conductors and abuts a shoulder in the insulator tube to prevent movement of the insulator tube along the power conductor.

18 Claims, 5 Drawing Sheets

(56) References Cited

U.S. PATENT DOCUMENTS

2003/0148638 A1\* 8/2003 McHugh .................. H02G 9/06
 439/32
2011/0235981 A1 9/2011 Guven et al.

\* cited by examiner

COILED TUBING ELECTRICAL POWER SPLICE

FIELD OF THE DISCLOSURE

This disclosure relates in general to power cable for electrical submersible well pumps, and in particular to a splice for coiled tubing containing a power cable.

BACKGROUND

Electrical submersible well pumps (ESP) are often used to pump liquids from hydrocarbon producing wells. A typical ESP includes a pump driven by an electrical motor. Production tubing, which comprises pipes having threaded ends secured together, supports the ESP in most installations. The pump normally pumps well fluid into the production tubing. A power cable extends alongside the production tubing to the motor for supplying power. Installing and retrieving the ESP requires a workover rig to pull the production tubing.

In other installations, coiled tubing supports the ESP. The coiled tubing comprises a continuous length or segment of steel tubing that can be wound on a large reel at the surface before deploying and after retrieving. A power cable with power conductors for supplying power to the motor extends through the coiled tubing. The pump discharges well fluid up the annulus surrounding the coiled tubing. A coiled tubing installation allows the ESP to be installed and retrieved without the need for a workover rig.

Some wells are too deep for a conventional reel of coiled tubing containing a power cable. It would be advantageous to be able to splice two segments of coiled tubing and power cable together. A splice would allow a second segment of coiled tubing and power cable to be brought to the well site on a separate reel. Splices for coiled tubing and power cable segments are not commercially available at this time.

SUMMARY

A power cable and load supporting assembly for downhole well equipment comprises a lower coiled tubing and power cable segment for supplying power to the downhole well equipment. The lower coiled tubing and power cable segment has three insulated lower power conductors. The lower coiled tubing and power cable segment has a severed upper end. The lower power conductors protrude upward from the severed upper end. An upper coiled tubing and power cable segment for support by a wellhead has three insulated upper power conductors. The upper coiled tubing and power cable segment has a severed lower end, and the upper power conductors protrude downward from the severed lower end. A splice connects the lower and upper coiled tubing and power cable segments. The splice comprises a base having a lower opening into which the severed upper end of the lower coiled tubing and power cable segment is inserted. A base wedge member within the base is in gripping engagement with the lower coiled tubing and power cable segment. A head has an upper opening into which the severed lower end of the upper coiled tubing and power cable segment is inserted. A head wedge member is in gripping engagement with the upper coiled tubing and power cable segment. The base has an upper end that secures to a lower end of the head, defining a load path from the lower coiled tubing and power cable segment through the base and the head to the upper coiled tubing and power cable segment. Electrical connectors join each of the lower power conductors to one of upper power conductors.

In the embodiment shown, the base wedge member moves into gripping engagement with the lower coiled tubing and power cable segment in response to downward movement of the base wedge member within the base. The head wedge member moves into gripping engagement with the upper coiled tubing and power cable segment in response to upward movement of the head wedge member within the head. A compression sleeve extends between the base wedge member and the head wedge member. The compression sleeve exerts a downward force on the base wedge member and an upward force on the head wedge member in response to securing the base and the head together.

In this embodiment, the upper end of the base has a set of threads and the lower end of the head has a set of threads. Rotation of the base and the head relative to each other secure the threads of the base to the threads of the head. The rotation of the base and the head relative to each other acts compressively on the compression sleeve to exert the upward and downward forces.

A lower compression ring may be located between a lower end of the compression sleeve and the base wedge member. An upper compression ring may be located between an upper end of the compression sleeve and the head wedge member. Each of the upper and lower compression rings may comprise two partly cylindrical halves.

In the embodiment shown, the base has a base conical surface having a decreasing diameter in a downward direction. The base wedge member comprises a base collet with fingers that deflect inward into gripping engagement with the lower coiled tubing and power cable segment as the base wedge member is moved downward relative to the base conical surface. The head has a head conical surface having a decreasing diameter in an upward direction. The head wedge member comprises a head collet with fingers that deflect inward into gripping engagement with the upper coiled tubing and power cable segment as the head wedge member is moved upward relative to the head conical surface.

Also, the illustrated embodiment discloses a plurality of insulator tubes, each sliding over one of the lower power conductors, one of the upper power conductors and one of the electrical connectors. Retainer rings are in gripping engagement with one of the lower and upper power conductors and with one of the insulator tubes to prevent sliding movement of the insulator tubes relative to the electrical connectors.

Each of the insulator tubes may comprise a rigid lower insulator tube member and an upper insulator tube member. Each of the lower insulator tube members has an upper end that secures to a lower end of one of the upper insulator tube members. A lower retainer ring grips one of the lower power conductors and is in abutment with an upward facing shoulder of one of the lower insulator tube members. An upper retainer ring grips one of the upper power conductors and is in abutment with a downward facing shoulder of one of the upper insulator tube members.

DETAILED DESCRIPTION OF THE DISCLOSURE

Figure 1:
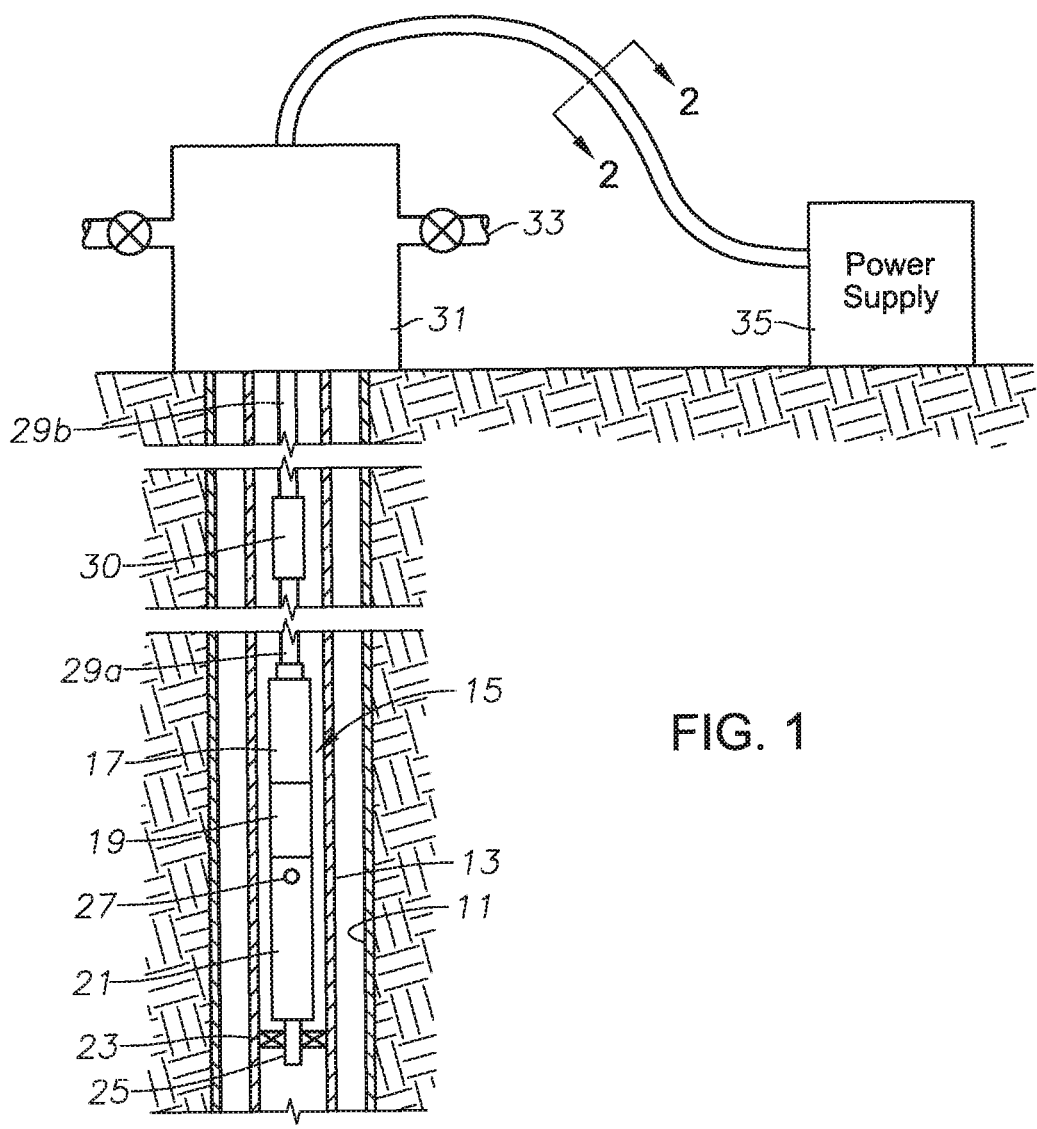
FIG. 1 is a schematic side view of an electrical submersible pump suspended in a well on coiled tubing having a splice in accordance with this invention.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude. The terms "upper" and "lower" are used only for convenience as the well pump may operate in positions other than vertical, including in horizontal sections of a well.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, a well casing 11 has a string of production tubing 13. Downhole equipment that may be an electrical submersible pump (ESP) 15 is located within production tubing 13. In this example, ESP 15 has an electrical motor 17 on the upper end. A seal section 19 connects to the lower end of motor 17 and has a pressure equalizer to reduce a pressure differential between lubricant in motor 17 and well fluid on the exterior. A pump 21 secures to the lower end of seal section 19. Pump 21 may be a centrifugal pump with a large number of stages, each stage having an impeller and a diffuser. Pump 21 has an intake 25 that extends through a packer 23 for drawing in well fluid. Pump 21 has a discharge 27 on its upper end that discharges well fluid into an annulus surrounding seal section 19 and motor 17 within production tubing 13. Other configurations and types of ESP 15 are feasible.

A lower coiled tubing and power cable segment 29a connects to the upper end of motor 17 and supports ESP 15 within production tubing 13. The terms "lower", "upper" and the like are used only for convenience because ESP 15 may be operated in other orientations, including horizontal. Lower coiled tubing and power cable segment 29a includes a continuous length of a steel tube 32a that has a capability of being wound around a large reel when out of the well. An upper coiled tubing and power cable segment 29b includes a continuous length of a steel tube or coiled tubing 32b that has a capability of being wound around a large reel when out of the well. A splice 30 joins lower coiled tubing and power cable segment 29a to upper coiled tubing and power cable segment 29b. Lower and upper coiled tubing and power cable segments 29a, 29b may be identical, but would normally have different lengths. FIG. 1 illustrates splice 30 as being located at a selected depth within production tubing 13, as an example.

A conventional hanger (not shown) supports an upper end portion of upper coiled tubing and power cable segment 29b within a wellhead assembly or tree 31. Well fluid being pumped by ESP 15 flows from production tubing 13 into tree 31 and out a flow line 33. Upper coiled tubing and power cable segment 29b extends upward through wellhead assembly 31 and is electrically connected to an adjacent controller or power supply 35.

Figure 2:
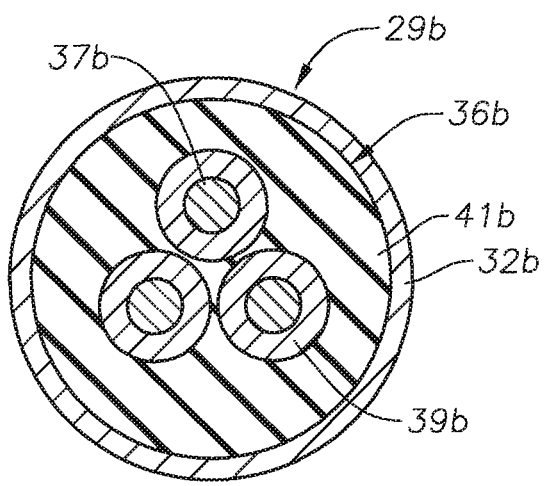
FIG. 2 is a sectional view of the coiled tubing of FIG. 1 taken along the line 2-2 of FIG. 1.

Referring to FIG. 2, upper coiled tubing and power cable segment 29b contains an upper electrical power cable segment 36b within upper coiled tubing segment 32b for supplying three-phase electrical power to motor 17 (FIG. 1). Upper power cable segment 36b has three power conductors 37b that are arranged 120 degrees apart from each other relative to a centerline of upper power cable segment 36b. Each upper power conductor 37b is encased in one or more separate electrical insulation layers 39b. Also, the three upper power conductors 37b and their insulation layers 39b may be embedded within an elastomeric jacket 41b, which is extruded over upper power conductors 37b. One or more capillary tubes (not shown) could also be embedded within jacket 41b for supplying fluid downhole.

The exterior of jacket 41b is cylindrical and optionally may have a helical wrap of a metal strip of armor (not shown) surrounding it. Upper power cable segment 36b may be installed in upper coiled tubing segment 32b while upper coiled tubing segment 32b is being rolled into a cylindrical shape and seam welded. Alternately, upper power cable segment 36b may be pulled into upper coiled tubing segment 32b after upper coiled tubing segment 32b has been manufactured. Upper power cable 36b normally lacks the ability to support its own weight in a well, thus various arrangements may be made to frictionally transfer the weight of upper power cable segment 36b to upper coiled tubing segment 32b along the length of upper coiled tubing segment 32b. Lower coiled tubing and power cable segment 29a (FIG. 1) may be identical to the cross-sectional view shown in FIG. 2.

Figure 3A:
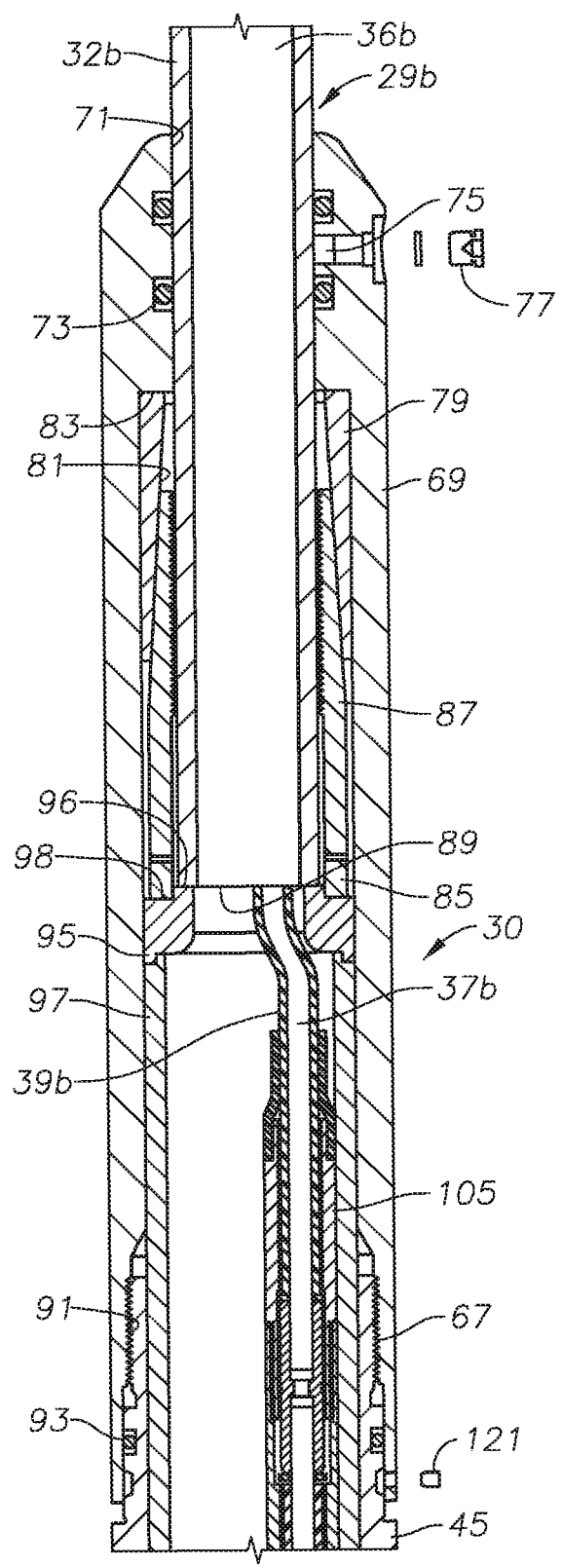
FIGS. 3A and 3B comprise a sectional view of the splice of FIG. 1, and showing only one of the conductors.
Figure 3B:
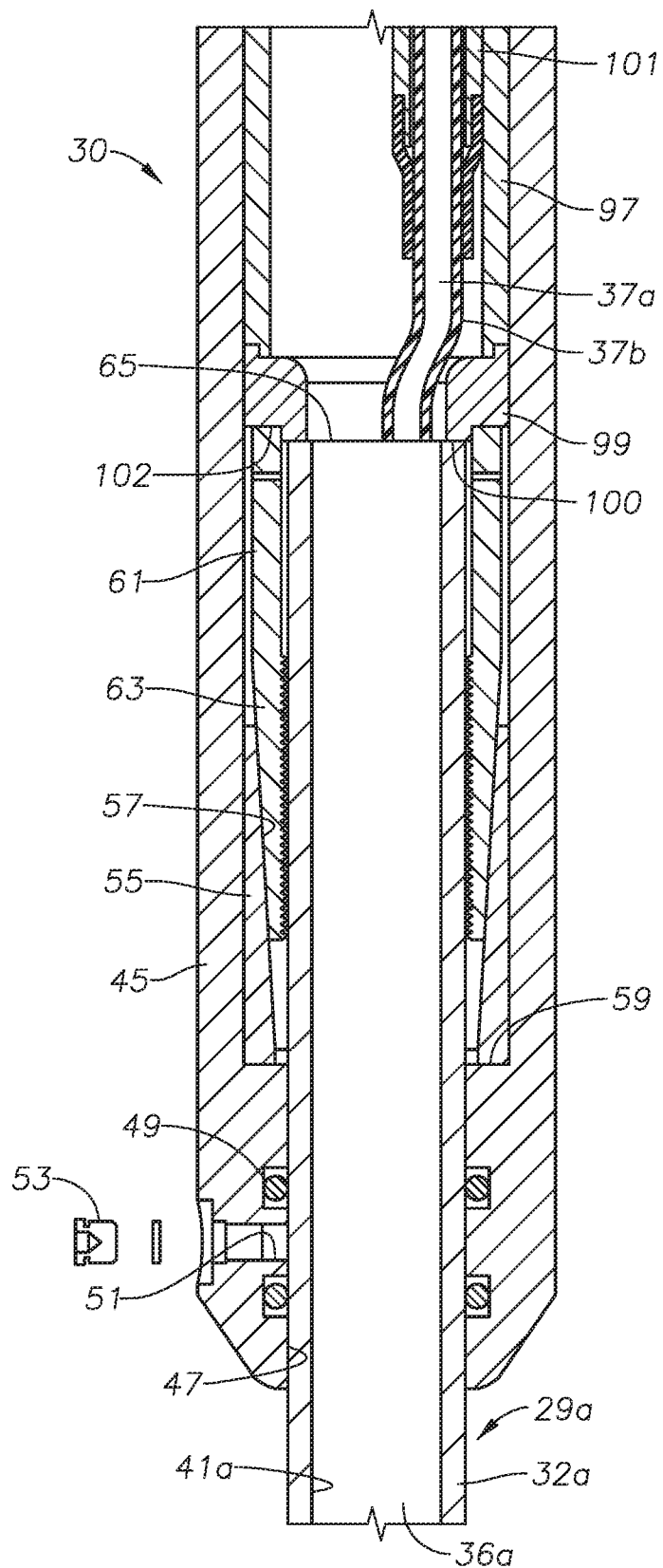

Referring to FIG. 3B, for clarity, only one of the lower power conductors 37a and one of the upper power conductors 37b are illustrated; normally there would be three of each. Also, if a capillary tube (not shown) is employed, a type of swage coupling would be employed to connect the upper and lower portions of the capillary tube. Splice 30 includes a lower housing or base 45 that may be formed of a corrosion resistant material, such as a type of steel. Base 45 is a cylindrical member having a lower opening 47 along its axis into which an upper portion of lower coiled tubing and power cable segment 29a inserts. A pair of lower seals 49 seal between the outer diameter of lower coiled tubing and power cable segment 29a and the inner diameter of base opening 47. An optional test port 51 extends from the exterior of base 45 to a point between lower seals 49 to test the seals. A plug 53 closes test port 51 after testing.

A collet support or conical member 55 fits within the interior of base 45. Conical member 55 has a conical interior surface 57 and rests on an upward facing shoulder 59 within base 45. Conical member 55 could be integrally formed with base 45. Conical interior surface 57 decreases in diameter in a downward direction.

A base wedge member or collet 61 fits within interior conical surface 57. Base wedge member 61 has fingers 63 on its lower end that are separated from each other by slots. Moving base wedge member 61 downward in conical interior surface 57 causes fingers 63 to deflect inward and frictionally engage lower coiled tubing segment 32a. Fingers 63 may have knurled or threaded inner surfaces to enhance frictional engagement of lower coiled tubing segment 32a. Lower coiled tubing and power cable segment 29a protrudes into and has a severed or cut upper end 65 within base 45. Power cable jacket 41a and coiled tubing 32a within lower coiled tubing segment 29a may be flush at upper severed end 65.

FIG. 3B shows base wedge member 61 in a set position, with upper severed end 65 slightly below the upper end of base wedge member 61, but it could be at other positions relative to the upper end of base wedge member 61. An upper portion of each lower power conductor 37a (only one shown in FIG. 3B) protrudes upward from upper severed end 65.

Referring to FIG. 3A, base 45 has a threaded upper end 67. In this example, the threads on threaded upper end 67 are external, but they could alternately be internal.

The housing for splice 30 also includes a head 69. Head 69 is a cylindrical member having an upper opening 71 along its axis into which a lower portion of upper coiled tubing and power cable segment 29b inserts. A pair of upper seals 73 seal between the outer diameter of upper coiled tubing and power cable segment 29b and the inner diameter of head opening 71. An optional test port 75 extends from the exterior of head 69 to a point between upper seals 73 to test the seals. A plug 77 closes test port 75 after testing.

A collet support or conical member 79 fits within the interior of head 69. Conical member 79 has a conical interior surface 81, and its upper end abuts a downward facing shoulder 83 within head 69 when splice 30 is complete. Conical member 79 could be integrally formed with head 69. Conical interior surface 81 decreases in diameter in an upward direction.

A head wedge member or collet 85 fits within conical interior surface 81. Head wedge member 85 has fingers 87 on its upper end that are separated from each other by slots. Moving head wedge member 85 upward in conical interior surface 81 causes fingers 87 to deflect inward and frictionally engage upper coiled tubing segment 32b. Fingers 63 may have knurled inner surfaces to enhance frictional engagement of upper coiled tubing segment 32b. Upper coiled tubing and power cable segment 29b protrudes into and has a severed or cut lower end 89 within head 69.

FIG. 3A shows head wedge member 85 in a set position, with lower severed end 89 slightly above the lower end of head wedge member 85, but it could be at other positions relative to the lower end of head wedge member 85. A lower portion of each upper power conductor 37b (only one shown) protrudes downward below lower severed end 89.

Head 69 has a lower end with threads 91 that engage base threaded end 67 when head 69 and base 45 are rotated relative to each other. An intermediate seal 93 seals between the exterior of an upper portion of base 45 and an interior portion of the lower end of head 69 below threads 91. Lower seals 49, upper seals 73 and intermediate seal 93 seal the interior cavity of splice 30 from the entry of well fluid.

In this embodiment, an upper compression ring 95 abuts the lower end of base wedge member 85. Compression ring 95 may have a stepped upper side with an inner shoulder 96 encircled by an outer shoulder 98 that is spaced slightly above inner shoulder 96. Outer shoulder 98 has an inner diameter greater than the outer diameter of upper coiled tubing segment 32b so that it abuts only the lower end of base wedge member 85. Inner shoulder 96 does not abut the lower end of base wedge member 85; rather it abuts upper coiled tubing segment 32b at lower severed end 89. Upper compression ring 95 may be formed in two semi-cylindrical halves rather than a single piece for ease in installation.

A compression sleeve 97 has an upper end that abuts upper compression ring 95 after splice 30 is constructed. Compression sleeve 97 is a rigid cylindrical member having an outer diameter slightly smaller than the inner diameter of head 69 below downward facing shoulder 83. The lower end of compression sleeve 97 abuts a lower compression ring 99, as shown in FIG. 3B. Lower compression ring 99 is illustrated as being identical to upper compression ring 95 but inverted. An inner shoulder 100 on the lower side of lower compression ring 99 abuts lower coiled tubing segment 32a. An outer shoulder 102 encircling inner shoulder 100 on the lower side of lower compression ring 99 abuts the upper end of base wedge member 61. In this example, outer shoulder 102 is slightly higher than inner shoulder 100 after the installation of splice 30 has been completed. Compression sleeve 97 is coaxial with the longitudinal axis of base 45 and head 69, thus will enclose all of the conductors 37a, 37b.

Figure 4A:
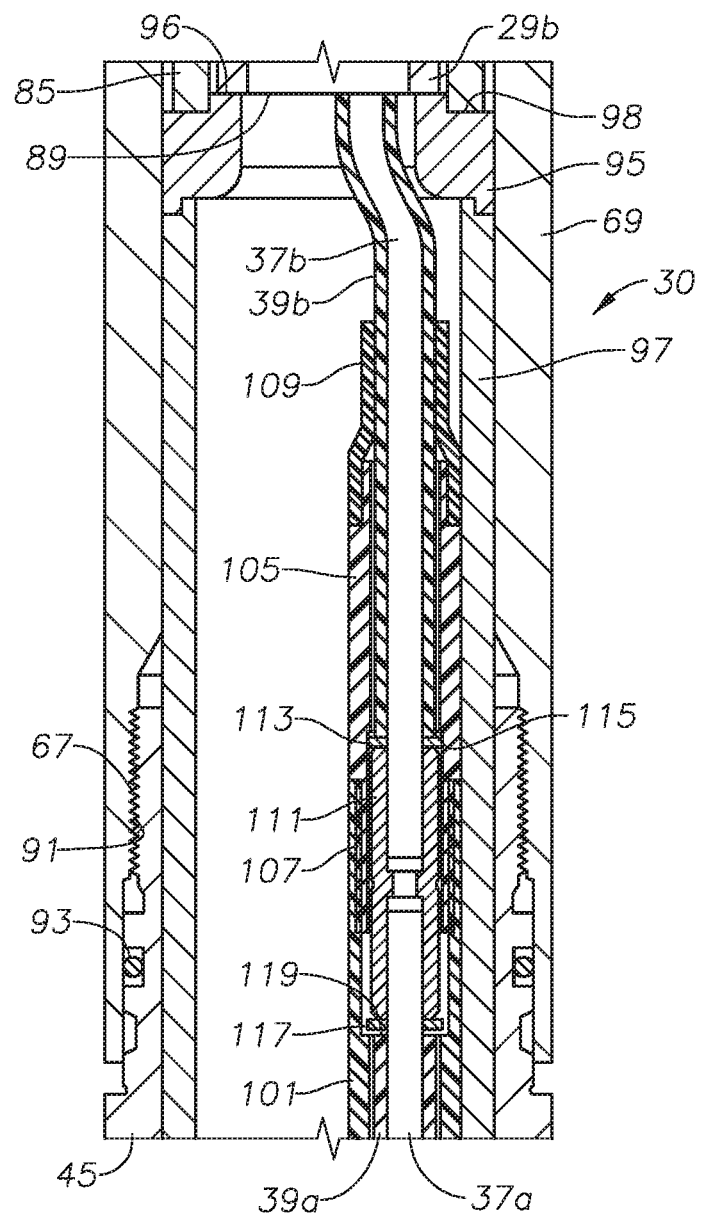
FIGS. 4A and 4B comprise an enlarged view of a portion of the splice of FIGS. 3A and 3B.
Figure 4B:
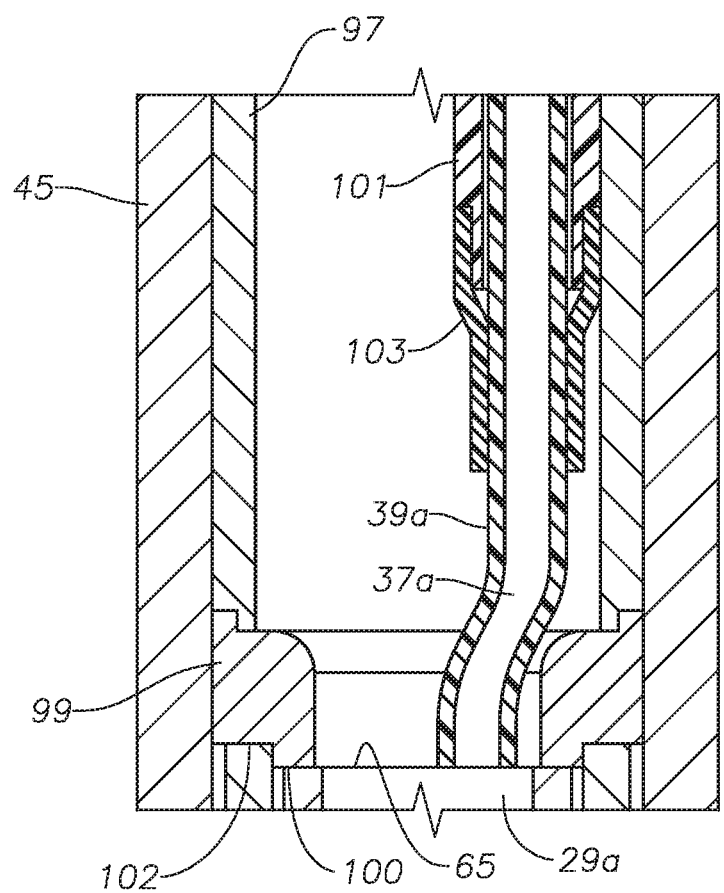

Referring to FIG. 4B, a lower insulation tube member 101 slides over the protruding portion of one of the lower power conductors 37a. Lower insulation tube 101 is concentric with the protruding portion of lower power conductor 37a and offset from the longitudinal axis of base 45 and head 69. Separate lower insulation tubes 101 (only one shown) would contain the other two lower power conductors 37a. Lower insulation tube 101 is formed of an electrical insulation material, such as PEEK, and is rigid in this embodiment. An elastomeric, flexible, lower boot 103 has an upper portion that seals to the lower end of lower insulation tube 101 and a smaller diameter lower portion that seals to insulation layer 39a on lower power conductor 37a.

Referring to FIG. 4A, an upper insulation tube member 105 slides over the protruding portion of each upper power conductor 37b (only one shown). Upper insulation tube 105 is concentric with the protruding portion of upper power conductor 37b and coaxial with one of the lower insulation tubes 101. Upper insulation tube 105 is formed of an electrical insulation material, such as PEEK, and is rigid in this embodiment. Upper insulation tube 105 has a lower end with threads 107 that engage mating threads on the upper end of lower insulation tube 101. Threads 107 optionally may also form a seal for the assembled insulation tube made up of tube members 101 and 105. An elastomeric, flexible, upper boot 109 has a lower portion that seals to the upper end of upper insulation tube 105 and a smaller diameter upper portion that seals to insulation layer 39b on upper power conductor 37b. Lower and upper insulation tubes 101, 105 define upper and lower portions of an insulation tube once assembled.

A conventional electrical crimp connector 111 joins lower power conductor 37a with upper power conductor 37b. Crimp connector 111 is a tubular member formed of conductive metal, such as copper. The lower portion of crimp connector 111 crimps to a stripped back, exposed portion of lower power conductor 37a at a place slightly above the upper end of lower power conductor insulation layer 39a. The upper portion of crimp connector 111 crimps to a stripped back, exposed portion of upper power conductor 37b at a place slightly below the lower end of upper power conductor insulation layer 39b.

An upper retainer ring 113 fits in the space between the upper end of crimp connector 111 and the lower end of upper power conductor insulation layer 39b. Retainer ring 113 may be a resilient split ring of a metal that will frictionally grip an exposed portion of upper power conductor 37b below the lower end of upper power conductor insulation layer 39b and above the upper end of crimp connector 111. Upper retainer ring 113 has an upper side that is in substantial contact with the lower end of upper power conductor insulation layer 39b and a lower side that is in substantial contact with the upper end of crimp connector 111. Slight clearances may exist. Also, the outer diameter portion of the upper side of upper retainer ring 113 will abut a downward facing shoulder 115 in the interior of upper insulation tube 105 if upper insulation tube 105 begins to slide downward on upper power conductor 37b.

In the same manner, a lower retainer ring 117 fits in the space between the lower end of crimp connector 111 and the upper end of lower power conductor insulation layer 39a. Lower retainer ring 117 may be identical to upper retainer ring 113. Lower retainer ring 117 frictionally grips an exposed portion of lower power conductor 37a above the upper end of lower power conductor insulation layer 39a and below the lower end of crimp connector 111. Lower retainer ring 117 has a lower side that is in substantial contact with the upper end of lower power conductor insulation layer 39a and an upper side that is in substantial contact with the lower end of crimp connector 111. Slight clearances may exist. Also, the outer diameter portion of the lower side of lower retainer ring 117 will abut an upward facing shoulder 119 in the interior of lower insulation tube 101 if lower insulation tube 101 begins to slide upward on lower power conductor 37a.

Splice 30 may be formed for several reasons. For example, splice 30 may be made if the length of lower coiled tubing and power cable segment 29a is not adequate for the depth of the well. Splice 30 may be formed in various manners and the various steps can be made in different orders. In one method, a technician forms severed ends 65, 89 with power conductors 37a, 37b protruding therefrom. The technician slides base 45 over lower coiled tubing and power cable segment 29a and head 69 over upper coiled tubing and power cable segment 29b. The technician places base conical member 55 and base wedge member 61 in base 45. The technician places head conical member 79 and head wedge member 85 in head 69.

The technician slides lower boot 103 and lower insulation tube 101 over each lower power conductor 37a. The technician will have previously provided enough length for the protruding portions of lower power conductors 37a to place the upper end of lower insulation layer 39a above lower insulation tube 101. The technician crimps crimp connector 111 to the exposed upper end of lower power conductor 37a and secures lower retainer ring 117. The technician slides compression sleeve 97 over all three of the protruding portions of the lower power conductors 37a either before or after crimping the lower ends of crimp connectors 111 to the lower power conductors 37a.

The technician slides upper boot 109 and upper insulation tube 105 over upper insulation layer 39b. The technician crimps the upper end of crimp connector 111 to the exposed lower end of upper power conductor 37b and secures upper retainer ring 113. The technician then secures upper insulation tube 105 to lower insulation tube 101 with threads 107. The technician installs lower compression ring 99 and upper compression ring 95, then secures base 45 to head 69. The relative rotation of base 45 and head 69 causes compression sleeve 97 to exert a downward force on lower wedge member 61 and an upward force on upper wedge member 85. An optional set screw 121 may then be secured to resist unscrewing rotation of base 45 and head 69. Compression sleeve 97 defines a load path of the weight of lower coiled tubing and power cable segment 29a passing through lower wedge member 63, base 45, head 69 and upper wedge member 85 to upper coiled tubing and power cable segment 29b.

The present invention described herein, therefore, is well adapted to carry out the objects and attain the ends and advantages mentioned, as well as others inherent therein. While only a few embodiments of the invention have been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

The invention claimed is:

1. A power cable and load supporting assembly for downhole well equipment, comprising:
   a lower coiled tubing and power cable segment for supplying power to the downhole well equipment, the lower coiled tubing and power cable segment having three insulated lower power conductors, the lower coiled tubing and power cable segment having a severed upper end, the lower power conductors protruding upward from the severed upper end of the lower coiled tubing and power cable segment;
   an upper coiled tubing and power cable segment for support by a wellhead, the upper coiled tubing and power cable segment having three insulated upper power conductors, the upper coiled tubing and power cable segment having a severed lower end, the upper power conductors protruding downward from the severed lower end;
   a splice connecting the lower and upper coiled tubing and power cable segments, comprising:
   a base having a lower opening into which the severed upper end of the lower coiled tubing and power cable segment is inserted;
   a base wedge member within the base in gripping engagement with the lower coiled tubing and power cable segment;
   a head having an upper opening into which the severed lower end of the upper coiled tubing and power cable segment is inserted;
   a head wedge member within the head in gripping engagement with the upper coiled tubing and power cable segment;
   the base having an upper end that secures to a lower end of the head, defining a load path from the lower coiled tubing and power cable segment through the base and the head to the upper coiled tubing and power cable segment;
   a plurality of electrical connectors, each joining one of the lower power conductors to one of upper power conductors; and
   wherein each of the base and the head wedge members comprises a collet having inwardly deflecting fingers.

2. A power cable and load supporting assembly for downhole well equipment, comprising:
   a lower coiled tubing and power cable segment for supplying power to the downhole well equipment, the lower coiled tubing and power cable segment having three insulated lower power conductors, the lower coiled tubing and power cable segment having a severed upper end, the lower power conductors protruding upward from the severed upper end of the lower coiled tubing and power cable segment;
   an upper coiled tubing and power cable segment for support by a wellhead, the upper coiled tubing and power cable segment having three insulated upper power conductors, the upper coiled tubing and power cable segment having a severed lower end, the upper power conductors protruding downward from the severed lower end;
a splice connecting the lower and upper coiled tubing and power cable segments, comprising:
a base having a lower opening into which the severed upper end of the lower coiled tubing and power cable segment is inserted;
a base wedge member within the base in gripping engagement with the lower coiled tubing and power cable segment;
a head having an upper opening into which the severed lower end of the upper coiled tubing and power cable segment is inserted;
a head wedge member within the head in gripping engagement with the upper coiled tubing and power cable segment;
the base having an upper end that secures to a lower end of the head, defining a load path from the lower coiled tubing and power cable segment through the base and the head to the upper coiled tubing and power cable segment;
a plurality of electrical connectors, each joining one of the lower power conductors to one of upper power conductors; wherein:
the base wedge member moves into gripping engagement with the lower coiled tubing and power cable segment in response to downward movement of the base wedge member within the base;
the head wedge member moves into gripping engagement with the upper coiled tubing and power cable segment in response to upward movement of the head wedge member within the head; and the assembly further comprises:
a compression sleeve extending between the base wedge member and the head wedge member, the compression sleeve exerting a downward force on the base wedge member and an upward force on the head wedge member in response to securing the base and the head together.

3. The assembly according to claim 2, wherein:
the upper end of the base has a set of threads and the lower end of the head has a set of threads, such that rotation of the base and the head relative to each other secure the threads of the base to the threads of the head; and
the rotation of the base and the head relative to each other acts on the compression sleeve to exert the upward and downward forces.

4. The assembly according to claim 2, further comprising:
a lower compression ring between a lower end of the compression sleeve and the base wedge member;
an upper compression ring between an upper end of the compression sleeve and the head wedge member; and wherein
each of the upper and lower compression rings comprises two partly cylindrical halves.

5. A power cable and load supporting assembly for downhole well equipment, comprising:
a lower coiled tubing and power cable segment for supplying power to the downhole well equipment, the lower coiled tubing and power cable segment having three insulated lower power conductors, the lower coiled tubing and power cable segment having a severed upper end, the lower power conductors protruding upward from the severed upper end of the lower coiled tubing and power cable segment;
an upper coiled tubing and power cable segment for support by a wellhead, the upper coiled tubing and power cable segment having three insulated upper power conductors, the upper coiled tubing and power cable segment having a severed lower end, the upper power conductors protruding downward from the severed lower end;
a splice connecting the lower and upper coiled tubing and power cable segments, comprising:
a base having a lower opening into which the severed upper end of the lower coiled tubing and power cable segment is inserted;
a base wedge member within the base in gripping engagement with the lower coiled tubing and power cable segment;
a head having an upper opening into which the severed lower end of the upper coiled tubing and power cable segment is inserted;
a head wedge member within the head in gripping engagement with the upper coiled tubing and power cable segment;
the base having an upper end that secures to a lower end of the head, defining a load path from the lower coiled tubing and power cable segment through the base and the head to the upper coiled tubing and power cable segment;
a plurality of electrical connectors, each joining one of the lower power conductors to one of upper power conductors; wherein:
the base has a base conical surface having a decreasing diameter in a downward direction;
the base wedge member comprises a base collet with fingers that deflect inward into gripping engagement with the lower coiled tubing and power cable segment as the base wedge member is moved downward relative to the base conical surface;
the head has a head conical surface having a decreasing diameter in an upward direction; and
the head wedge member comprises a head collet with fingers that deflect inward into gripping engagement with the upper coiled tubing and power cable segment as the head wedge member is moved upward relative to the head conical surface.

6. A power cable and load supporting assembly for downhole well equipment, comprising:
a lower coiled tubing and power cable segment for supplying power to the downhole well equipment, the lower coiled tubing and power cable segment having three insulated lower power conductors, the lower coiled tubing and power cable segment having a severed upper end, the lower power conductors protruding upward from the severed upper end of the lower coiled tubing and power cable segment;
an upper coiled tubing and power cable segment for support by a wellhead, the upper coiled tubing and power cable segment having three insulated upper power conductors, the upper coiled tubing and power cable segment having a severed lower end, the upper power conductors protruding downward from the severed lower end;
a splice connecting the lower and upper coiled tubing and power cable segments, comprising:
a base having a lower opening into which the severed upper end of the lower coiled tubing and power cable segment is inserted;

a base wedge member within the base in gripping engagement with the lower coiled tubing and power cable segment;

a head having an upper opening into which the severed lower end of the upper coiled tubing and power cable segment is inserted;

a head wedge member within the head in gripping engagement with the upper coiled tubing and power cable segment;

the base having an upper end that secures to a lower end of the head, defining a load path from the lower coiled tubing and power cable segment through the base and the head to the upper coiled tubing and power cable segment;

a plurality of electrical connectors, each joining one of the lower power conductors to one of upper power conductors;

a plurality of insulator tubes, each sliding over one of the lower power conductors, one of the upper power conductors and one of the electrical connectors; and a plurality of retainer rings, each in gripping engagement with one of the lower and upper power conductors and with one of the insulator tubes to prevent sliding movement of the insulator tubes relative to the electrical connectors.

7. A power cable and load supporting assembly for downhole well equipment, comprising:

a lower coiled tubing and power cable segment for supplying power to the downhole well equipment, the lower coiled tubing and power cable segment having three insulated lower power conductors, the lower coiled tubing and power cable segment having a severed upper end, the lower power conductors protruding upward from the severed upper end of the lower coiled tubing and power cable segment;

an upper coiled tubing and power cable segment for support by a wellhead, the upper coiled tubing and power cable segment having three insulated upper power conductors, the upper coiled tubing and power cable segment having a severed lower end, the upper power conductors protruding downward from the severed lower end;

a splice connecting the lower and upper coiled tubing and power cable segments, comprising:

a base having a lower opening into which the severed upper end of the lower coiled tubing and power cable segment is inserted;

a base wedge member within the base in gripping engagement with the lower coiled tubing and power cable segment;

a head having an upper opening into which the severed lower end of the upper coiled tubing and power cable segment is inserted;

a head wedge member within the head in gripping engagement with the upper coiled tubing and power cable segment;

the base having an upper end that secures to a lower end of the head, defining a load path from the lower coiled tubing and power cable segment through the base and the head to the upper coiled tubing and power cable segment;

a plurality of electrical connectors, each joining one of the lower power conductors to one of upper power conductors;

a plurality of rigid lower insulator tubes, each sliding over one of the lower power conductors;

a plurality of rigid upper insulator tubes, each sliding over one of the upper power conductors;

each of the lower insulator tubes having an upper end that secures to a lower end of one of the upper insulator tubes;

a plurality of lower retainer rings, each gripping one of the lower power conductors and in abutment with an upward facing shoulder of one of the lower insulator tubes; and a plurality of upper retainer rings, each gripping one of the upper power conductors and in abutment with a downward facing shoulder of one of the upper insulator tubes.

8. A power cable and load supporting assembly for downhole well equipment, comprising:

a lower coiled tubing and power cable segment for supporting and supplying power to the well equipment, the lower coiled tubing and power cable segment having an insulated lower power conductor, the lower coiled tubing and power cable segment having a severed upper end, the lower power conductor protruding upward from the severed upper end of the lower coiled tubing and power cable segment;

an upper coiled tubing and power cable segment for support by a wellhead, the upper coiled tubing and power cable segment having an insulated upper power conductor, the upper coiled tubing and power cable segment having a severed lower end, the upper power conductor protruding downward from the severed lower end;

a splice connecting the lower and upper coiled tubing and power cable segments, comprising:

a base having a lower opening into which the severed upper end of the lower coiled tubing and power cable segment inserts, the base having an interior conical surface with a decreasing diameter in a downward direction, the base having an upper threaded end;

a base collet in engagement with the conical surface of the base, the base collet having fingers that deflect inward in gripping engagement with the lower coiled tubing and power cable segment in response to downward movement of the base collet in the conical surface of the base;

a head having an upper opening into which the severed lower end of the upper coiled tubing and power cable segment inserts, the head having an interior conical surface with a decreasing diameter in an upward direction, the head having a threaded lower end that secures to the threaded upper end of the base;

a head collet in engagement with the conical surface of the head, the head collet having fingers that deflect inward in gripping engagement with the upper coiled tubing and power cable segment in response to upward movement of the head collet in the conical surface of the head;

a compression sleeve extending between the base collet and the head collet, the compression sleeve exerting a downward force on the base collet and an upward force on the head collet in response to securing the upper threaded end of the base to the lower threaded end of the head; and an electrical connector joining the lower power conductor to the upper power conductor.

9. The assembly according to claim 8, further comprising:

a lower compression ring between a lower end of the compression sleeve and the base collet;

an upper compression ring between an upper end of the compression sleeve and the head collet; wherein the lower compression ring has a lower stepped side with an outer shoulder that abuts the upper end of the base collet and an inner shoulder that abuts the upper severed end, the inner shoulder being at a lower elevation than the outer shoulder; and the upper compression ring has an upper stepped side with an outer shoulder that abuts the lower end of the head collet and an inner shoulder that abuts the lower severed end, the inner shoulder of the upper compression ring being at a higher elevation than the outer shoulder of the upper compression ring.

10. The assembly according to claim 8, further comprising:

a rigid insulator tube sliding over the lower power conductor, the upper power conductor and the electrical connector; and a retainer ring in engagement with one of the lower and upper power conductors and with the insulator tube to prevent sliding movement of the insulator tube relative to the electrical connector.

11. The assembly according to claim 8, further comprising:

a lower insulator tube sliding over the lower power conductor;

an upper insulator tube sliding over the upper power conductor;

the lower insulator tube having a threaded upper end that secures to a lower end of the upper insulator tube;

a lower retainer ring gripping the lower power conductor and in abutment with an upward facing shoulder of the lower insulator tube; and an upper retainer ring in gripping engagement with of the upper power conductor and in abutment with a downward facing shoulder of the upper insulator tube.

12. The assembly according to claim 11, wherein:

the electrical connector comprises a crimp connector sleeve;

the lower retainer ring abuts a lower end of the crimp connector sleeve; and the upper retainer ring abuts an upper end of the crimp connector sleeve.

13. A power cable and load supporting assembly for downhole well equipment, comprising:

a lower coiled tubing and power cable segment having a lower end for securing and supplying power to the well equipment, the lower coiled tubing and power cable segment having an insulated lower power conductor, the lower coiled tubing and power cable segment having a severed upper end, the lower power conductor protruding upward from the severed upper end of the lower coiled tubing and power cable segment;

an upper coiled tubing and power cable segment having an upper end for support within a wellhead, the upper coiled tubing and power cable segment having an insulated upper power conductor, the upper coiled tubing and power cable segment having a severed lower end, the upper power conductor protruding downward from the severed lower end;

a splice connecting the lower and upper coiled tubing and power cable segments, comprising:

a base having a lower opening into which the severed upper end of the lower coiled tubing and power cable segment is inserted;

a base wedge member within the base in gripping engagement with the lower coiled tubing and power cable segment;

a head having an upper opening into which the severed lower end of the upper coiled tubing and power cable segment is inserted, the head having a lower end that secures to an upper end of the base;

a head wedge member within the head in gripping engagement with the upper coiled tubing and power cable segment;

an insulator tube that slides over the lower power conductor, the upper power conductors and the electrical connector; and at least one retainer ring in gripping engagement with one of the lower and upper power conductors and in abutment with the insulator tube to prevent sliding movement of the insulator tube relative to the electrical connector.

14. The assembly according to claim 13, wherein:

the insulator tube comprises:

a lower insulator tube member that slides over the lower power conductor;

an upper insulator tube member that slides over the upper power conductor;

the lower insulator tube member having an upper end that secures to a lower end of the upper insulator tube member;

the at least one retainer ring comprises:

a lower retainer ring in gripping engagement with the lower power conductor and in abutment with an upward facing shoulder of the lower insulator tube member; and an upper retainer ring in gripping engagement with the upper power conductor and in abutment with a downward facing shoulder of one of the upper insulator tube member.

15. The assembly according to claim 14, wherein:

the electrical connector comprises a crimp connector sleeve;

the lower retainer ring abuts a lower end of the crimp connector sleeve; and the upper retainer ring abuts an upper end of the crimp connector sleeve.

16. The assembly according to claim 13, further comprising:

a lower boot sealing around a lower end of the insulator tube and the lower power conductor; and an upper boot sealing around an upper end of the insulator tube and the upper power conductor.

17. The assembly according to claim 13, wherein:

the base wedge member moves into gripping engagement with the lower coiled tubing and power cable segment in response to downward movement of the base wedge member within the base;

the head wedge member moves into gripping engagement with the upper coiled tubing and power cable segment in response to upward movement of the head wedge member within the head; and the assembly further comprises:

a compression sleeve extending between the base wedge member and the head wedge member, the compression sleeve exerting a downward force on the base wedge member and an upward force on the head wedge member in response to securing the base and the head together.

18. The assembly according to claim 17, wherein:
- the upper end of the base has a set of threads and the lower end of the head has a set of threads, such that rotation of the base and the head relative to each other secure the threads of the base to the threads of the head; and
- the rotation of the base and the head relative to each other acts on the compression sleeve to exert the upward and downward forces.

\* \* \* \* \*